US00RE38563E1

(19) United States
(12) Reissued Patent
Eifrig et al.

(10) Patent Number: US RE38,563 E
(45) Date of Reissued Patent: Aug. 10, 2004

(54) PREDICTION AND CODING OF BI-DIRECTIONALLY PREDICTED VIDEO OBJECT PLANES FOR INTERLACED DIGITAL VIDEO

(76) Inventors: Robert O. Eifrig, 9640 Carroll Canyon Rd., #I-7, San Diego, CA (US) 92126; Xuemin Chen, 8560 Foxcroft Pl., San Diego, CA (US) 92129; Ajay Luthra, 13695 Winstanley Way, San Diego, CA (US) 92130

(21) Appl. No.: 09/995,997

(22) Filed: Nov. 19, 2001

Related U.S. Patent Documents

Reissue of:
(64) Patent No.: 5,991,447
Issued: Nov. 23, 1999
Appl. No.: 08/944,118
Filed: Oct. 6, 1997

(60) Provisional application No. 60/040,120, filed on Mar. 7, 1997, and provisional application No. 60/042,245, filed on Mar. 31, 1997.

(51) Int. Cl.[7] ..... G06K 9/46; G06K 9/00

(52) U.S. Cl. ..... 382/236; 382/238

(58) Field of Search ..... 382/232, 251, 382/233, 252, 234, 253, 235, 238, 239, 240, 241, 242, 243, 244, 248, 250, 197, 236; 358/115; 712/1; 345/502, 418; 375/240.16, 240.18, 240.12, 240.13, 240.25; 348/390.1, 402.1, 403.1, 407.1, 408.1, 409.1, 416.1, 413.1, 415.1, 399.1, 699, 718, 719, 97

(56) References Cited

U.S. PATENT DOCUMENTS

| | | | |
|---|---|---|---|
| 5,510,857 | A | 4/1996 | Kopet et al. |
| 5,691,771 | A | 11/1997 | Oishi et al. |
| 5,740,340 | A | 4/1998 | Purcell et al. |
| 5,761,398 | A | 6/1998 | Legall |
| 5,786,860 | A | 7/1998 | Kim et al. |
| 5,793,895 | A | 8/1998 | Chang et al. |
| 5,801,778 | A | 9/1998 | Ju |
| 5,809,270 | A | 9/1998 | Robbins |
| 5,815,646 | A | 9/1998 | Purcell et al. |
| 5,825,931 | A | 10/1998 | Owada et al. |

*Primary Examiner*—Phuoc Tran
(74) *Attorney, Agent, or Firm*—Barry R Lipsitz

(57) ABSTRACT

A system for coding of digital video images such as bi-directionally predicted video object planes (B-VOPs), in particular, where the B-VOP and/or a reference image used to code the B-VOP is interlaced coded. For a B-VOP macroblock which is co-sited with a field predicted macroblock of a future anchor picture, direct mode prediction is made by calculating four field motion vectors, then generating the prediction macroblock. The four field motion vectors and their reference fields are determined from (1) an offset term of the current macroblock's coding vector, (2) the two future anchor picture field motion vectors, (3) the reference field used by the two field motion vectors of the co-sited future anchor macroblock, and (4) the temporal spacing, in field periods, between the current B-VOP fields and the anchor fields. Additionally, a coding mode decision process for the current MB selects a forward, backward, or average field coding mode according to a minimum sum of absolute differences (SAD) error which is obtained over the top and bottom fields of the current MB.

28 Claims, 8 Drawing Sheets

PREDICTION AND CODING OF BI-DIRECTIONALLY PREDICTED VIDEO OBJECT PLANES FOR INTERLACED DIGITAL VIDEO

Matter enclosed in heavy brackets [ ] appears in the original patent but forms no part of this reissue specification; matter printed in italics indicates the additions made by reissue.

This application claims the benefit of U.S. Provisional Application No. 60/040,120, filed Mar. 7, 1997, and U.S. Provisional Application No. 60/042,245, filed Mar. 31, 1997.

BACKGROUND OF THE INVENTION

The present invention provides a method and apparatus for coding of digital video images such as bi-directionally predicted video object planes (B-VOPs),in particular, where the B-VOP and/or a reference image used to code the B-VOP is interlaced coded.

The invention is particularly suitable for use with various multimedia applications, and is compatible with the MPEG-4 Verification Model (VM) 8.0 standard (MPEG-4 VM 8.0) described in document ISO/IEC/JTC1/SC29/WG11 N1796, entitled "MPEG-4 Video Verification Model Version 8.01", Stockholm, July 1997, incorporated herein by reference. The MPEG-2 standard is a precursor to the MPEG-4 standard, and is described in document ISO/IEC 13818-2, entitled "Information Technology—Generic Coding of Moving Pictures and Associated Audio, Recommendation H.262," Mar. 25, 1994, incorporated herein by reference.

MPEG-4 is a coding standard which provides a flexible framework and an open set of coding tools for communication, access, and manipulation of digital audio-visual data. These tools support a wide range of features. The flexible framework of MPEG-4 supports various combinations of coding tools and their corresponding functaionalities for applications required by the computer, telecommunication, and entertainment (i.e., TV and film) industries, such as database browsing, information retrieval, and interactive communications.

MPEG-4 provides standardized core technologies allowing efficient storage, transmission and manipulation of video data in multimedia environments. MPEG-4 achieves efficient compression, object scalability, spatial and temporal scalability, and error resilience.

The MPEG-4 video VM coder/decoder (codec) is a block- and object-based hybrid coder with motion compensation. Texture is encoded with an 8×8 Discrete Cosine Transformation (DCT) utilizing overlapped block-motion compensation. Object shapes are represented as alpha maps and encoded using a Content-based Arithmetic Encoding (CAE) algorithm or a modified DCT coder, both using temporal prediction. The coder can handle sprites as they are known from computer graphics. Other coding methods, such as wavelet and sprite coding, may also be used for special applications.

Motion compensated texture coding is a well known approach for video coding, and can be modeled as a three-stage process. The first stage is signal processing which includes motion estimation and compensation (ME/MC) and a two-dimensional (2-D) spatial transformation. The objective of ME/MC and the spatial transformation is to take advantage of temporal and spatial correlations in a video sequence to optimize the rate-distortion performance of quantization and entropy coding under a complexity constraint. The most common technique for ME/MC has been block matching, and the most common spatial transformation has been the DCT.

However, special concerns arise for ME/MC of macroblocks (MBs) in B-VOPs when the MB is itself interlaced coded and/or uses reference images which are interlaced coded.

In particular, it would be desirable to have an efficient technique for providing motion vector (MV) predictors for a MB in a B-VOP. It would also be desirable to have an efficient technique for direct mode coding of a field coded MB in a B-VOP. It would further be desirable to have a coding mode decision process for a MB in a field coded B-VOP for selecting the reference image which is results in the most efficient coding.

The present invention provides a system having the above and other advantages.

SUMMARY OF THE INVENTION

In accordance with the present invention, a method and apparatus are presented for coding of digital video images such as a current image (e.g., macroblock) in a bi-directionally predicted video object plane (B-VOP), in particular, where the current image and/or a reference image used to code the current image is interlaced (e.g., field) coded.

In a first aspect of the invention, a method provides direct mode motion vectors (MVs) for a current bi-directionally predicted, field coded image such as a macroblock (ME) having top and bottom fields, in a sequence of digital video images. A past field coded reference image having top and bottom fields, and a future field coded reference image having top and bottom fields are determined. The future image is predicted using the past image such that $MV_{top}$, a forward MV of the top field of the future image, references either the top or bottom field of said past image. The field which is referenced contains a best-match MB for a MB in the top field of the future image.

This MV is termed a "forward" MV since, although it references a past image (e.g., backward in time), the prediction is from the past image to the future image, e.g., forward in time. As a mnemonic, the prediction direction may be thought of as being opposite the direction of the corresponding MV.

Similarly, $MV_{bot}$, a forward motion vector of the bottom field of the future image, references either the top or bottom field of the past image. Forward and backward MVs are determined for predicting the top and/or bottom fields of the current image by scaling the forward MV of the corresponding field of the future image.

In particular, $MV_{f,top}$, the forward motion vector for predicting the top field of the current image, is determined according to the expression $MV_{f,top}=(MV_{top}*TR_{B,top})/TR_{D,top}+MV_D$, where $MV_D$ is a delta motion vector for a search area, $TR_{B,top}$ corresponds to a temporal spacing between the top field of the current image and the field of the past image which is referenced by $MV_{top}$, and $TR_{D,top}$ corresponds to a temporal spacing between the top field of the future image and the field of the past image which is referenced by $MV_{top}$. The temporal spacing may be related to a frame rate at which the images are displayed.

Similarly, $MV_{f,bot}$, the forward motion vector for predicting the bottom field of the current image, is determined according to the expression $MV_{f,bot}=(MV_{bot}*TR_{B,bot})/TR_{D,bot}+MV_D$, where $MV_D$ is a delta motion vector, $TR_{B,bot}$ corresponds to a temporal spacing between the bottom field of the current image and the field of the past image which is referenced by $MV_{bot}$, and $TR_{D,bot}$ corresponds to a temporal spacing between the bottom field of the future MB and the field of the past MB which is referenced by $MV_{bot}$.

$MV_{b,top}$, the backward motion vector for predicting the top field of the current MB is determined according to the equation $MV_{b,top}=((TR_{B,top}-TR_{D,top})*MV_{top})/TR_{D,top}$ when the delta motion vector $MV_D=0$, or $MV_{b,top}=MV_{f,top}-MV_{top}$ when $MV_D\neq 0$.

$MV_{b,bot}$, the backward motion vector for predicting the bottom field of the current MB is determined according to the equation $MV_{b,bot}=((TR_{B,bot}-TR_{D,bot})*MV_{bot})/TR_{D,bot}$ when the delta motion vector $MV_D=0$, or $MV_{b,bot}=MV_{f,bot}-MV_{bot}$ when $MV_D\neq 0$.

A corresponding decoder is also presented.

In another aspect of the invention, a method is presented for selecting a coding mode for a current predicted, field coded MB having top and bottom fields, in a sequence of digital video MBs. The coding mode may be a backward mode, where the reference MB is temporally after the current MB in display order, a forward mote, where the reference MB is before the current MB, or average (e.g., bi-directional) mode, where an average of prior and subsequent reference MBs is used.

The method includes the step of determining a forward sum of absolute differences error, $SAD_{forward,field}$ for the current MB relative to a past reference MB, which corresponds to a forward coding mode. $SAD_{forward,field}$ indicates the error in pixel luminance values between the current MB and a best match MB in the past reference MB. A backward sum of absolute differences error, $SAD_{backward,field}$ for the current MB relative to a future reference MB, which corresponds to a backward coding mode is also determined. $SAD_{backward,field}$ indicates the error in pixel luminance values between the current MB and a best match MB in the future reference MB.

An average sum of absolute differences error, $SAD_{average,field}$ for the current MB relative to an average of the past and future reference MBs, which corresponds to an average coding mode, is also determined. $SAD_{average,field}$ indicates the error in pixel luminance values between the current MB and a MB which is the average of the best match MBs of the past and future reference MBs.

The coding mode is selected according to the minimum of the SADs. Bias terms which account for the number of required MVs of the respective coding modes may also be factored into the coding mode selection process.

$SAD_{forward,field}$, $SAD_{backward,field}$, and $SAD_{average,field}$ are determined by summing the component terms over the top and bottom fields.

DETAILED DESCRIPTION OF THE INVENTION

A method and apparatus are presented for coding of a digital video image such as a macroblock (MB) in a bi-directionally predicted video object plane (B-VOP), in particular, where the MB and/or a reference image used to code the MB is interlaced coded. The scheme provides a method for selecting a prediction motion vector (PMV) for the top and bottom field of a field coded current MB, including forward and backward PMVs as required, as well as for frame coded MBs. A direct coding mode for a field coded MB is also presented, in addition to a coding decision process which uses the minimum of sum of absolute differences terms to select an optimum mode.

Figure 1:
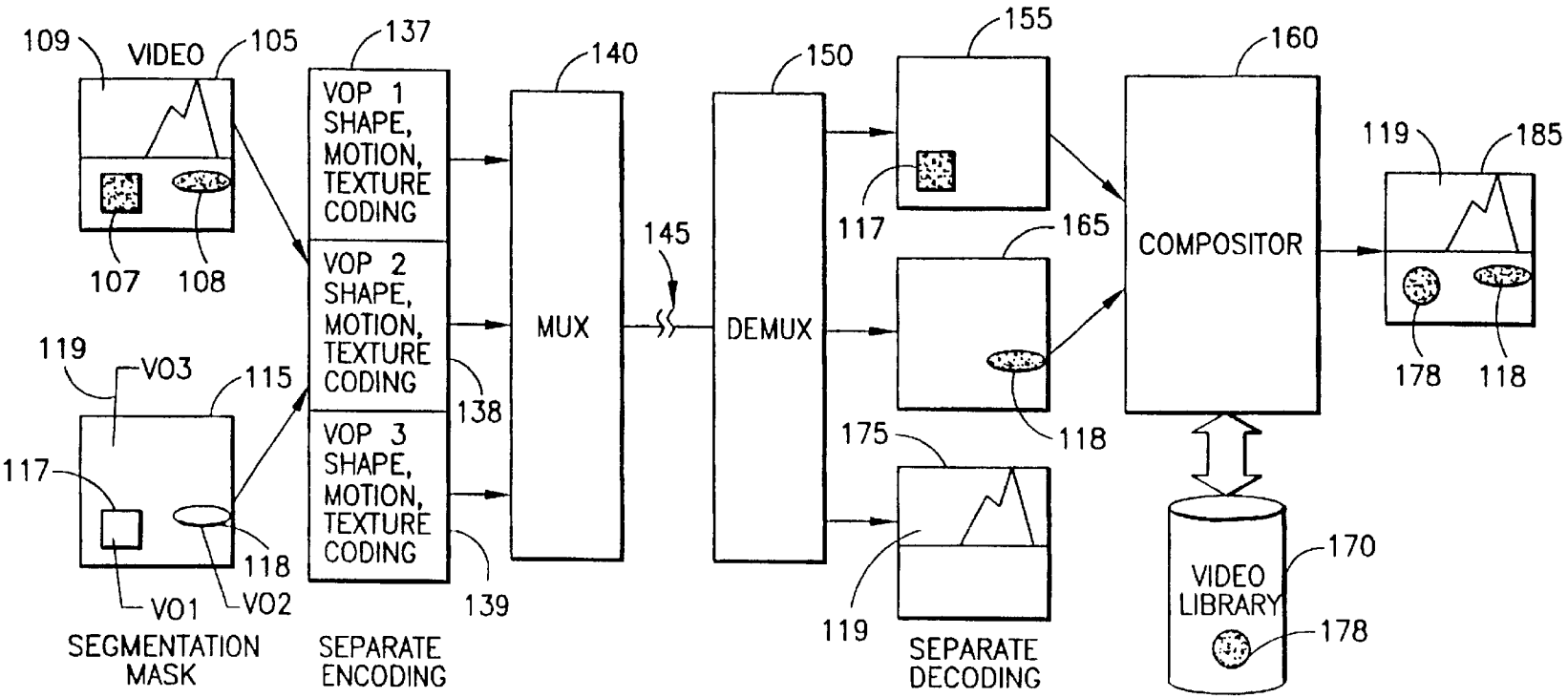
FIG. 1 is an illustration of a video object plane (VOP) coding and decoding process in accordance with the present invention.

FIG. 1 is an illustration of a video object plane (VOP) coding and decoding process in accordance with the present invention. Frame 105 includes three pictorial elements, including a square foreground element 107, an oblong foreground element 108, and a landscape backdrop element 109. In frame 115, the elements are designated VOPs using a segmentation mask such that VOP 117 represents the square foreground element 107, VOP 118 represents the oblong foreground element 108, and VOP 119 represents the landscape backdrop element 109. A VOP can have an arbitrary shape, and a succession of VOPs is known as a video object. A full rectangular video frame may also be considered to be a VOP. Thus, the term "VOP" will be used herein to indicate both arbitrary and non-arbitrary (e.g., rectangular) image area shapes. A segmentation mask is obtained using known techniques, and has a format similar to that of ITU-R 601 luminance data. Each pixel is identified as belonging to a certain region in the video frame.

The frame 105 and VOP data from frame 115 are supplied to separate encoding functions. In particular, VOPs 117, 118 and 119 undergo shape, motion and texture encoding at encoders 137, 138 and 139, respectively. With shape coding, binary and gray scale shape information is encoded. With motion coding, the shape information is coded using motion estimation within a frame. With texture coding, a spatial transformation such as the DCT is performed to obtain transform coefficients which can be variable-length coded for compression.

The coded VOP data is then combined at a multiplexer (MUX) 140 for transmission over a channel 145. Alternatively, the data may be stored on a recording medium. The received coded VOP data is separated by a demultiplexer (DEMUX) 150 so that the separate VOPs 117–119 are decoded and recovered. Frames 155, 165 and 175 show that VOPs 117, 118 and 119, respectively, have been decoded and recovered and can therefore be individually manipulated using a compositor 160 which interfaces with a video library 170, for example.

The compositor may be a device such as a personal computer which is located at a user's home to allow the user to edit the received data to provide a customized image. For example, the user's personal video library 170 may include a previously stored VOP 178 (e.g., a circle) which is different than the received VOPs. The user may compose a frame 185 where the circular VOP 178 replaces the square VOP 117. The frame 185 thus includes the received VOPs 118 and 119 and the locally stored VOP 178.

In another example, the background VOP 109 may be replaced by a background of the user's choosing. For example, when viewing a television news broadcast, the announcer may be coded as a VOP which is separate from the background, such as a new studio. The user may select a background from the library 170 or from another television program, such as a channel with stock price or weather information. The user can therefore act as a video editor.

The video library 170 may also store VOPs which are received via the channel 145, and may access VOPs and other image elements via a network such as the Internet. Generally, a video session comprises a single VOP, or a sequence of VOPs.

The video object coding and decoding process of FIG. 1 enables many entertainment, business and educational applications, including personal computer games, virtual environments, graphical user interfaces, videoconferencing, Internet applications and the like. In particular, the capability for ME/MC with interlaced coded (e.g., field mode) VOPs in accordance with the present invention provides even greater capabilities.

Figure 2:
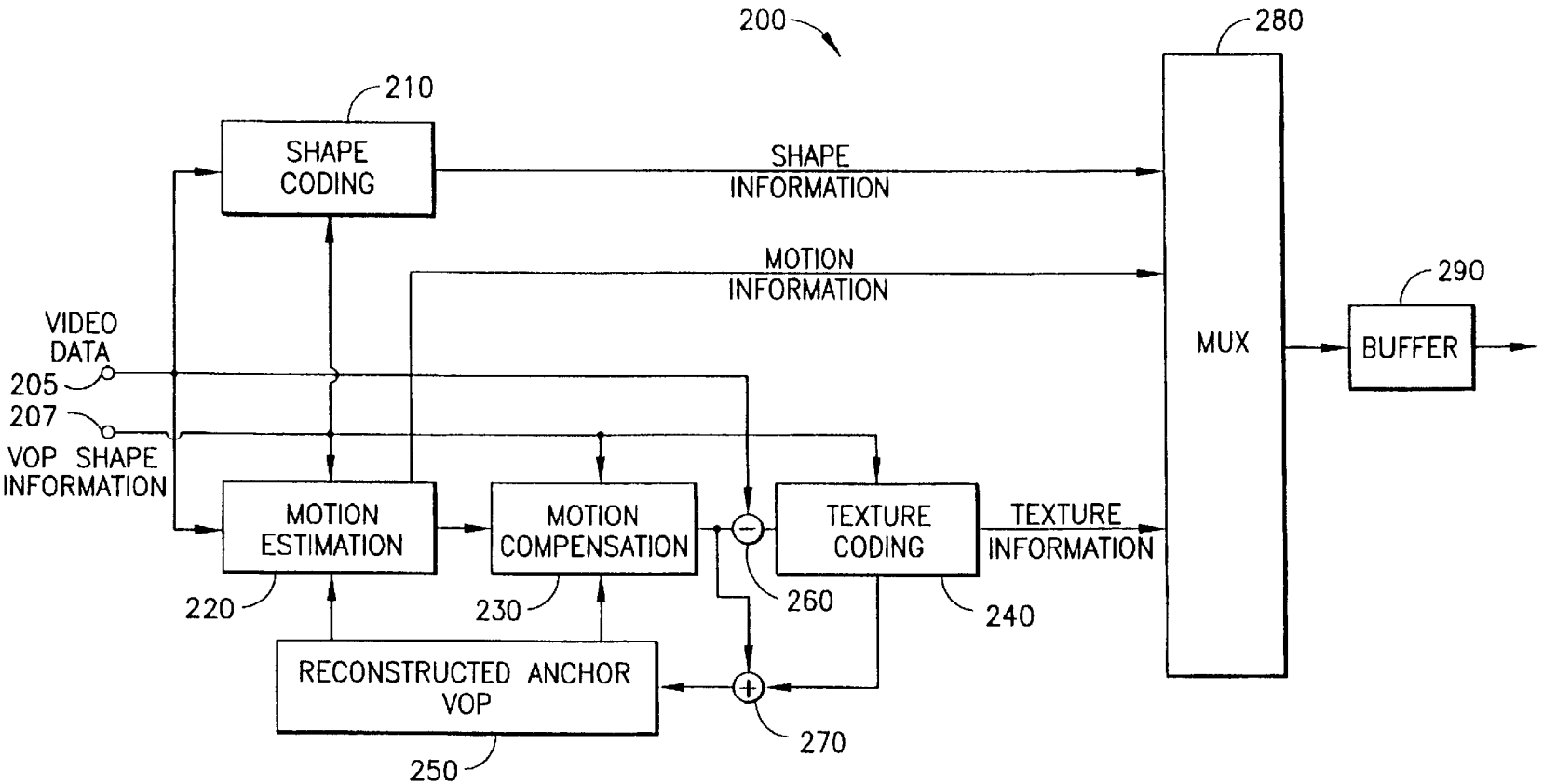
FIG. 2 is a block diagram of an encoder in accordance with the present invention.

FIG. 2 is a block diagram of an encoder in accordance with the present invention. The encoder is suitable for use with both predictive-coded VOPs (P-VOPs) and bi-directionally coded VOPs (B-VOPs).

P-VOPs may include a number of macroblocks (MBs) which may be coded individually using an intra-frame mode or an inter-frame mode. With intra-frame (INTRA) coding, the macroblock (MB) is coded without reference to another MB. With inter-frame (INTER) coding, the MB is differentially coded with respect to a temporally subsequent frame in a mode known as forward prediction. The temporally subsequent frame is known as an anchor frame or reference frame. The anchor frame (e.g., VOP) must be a P-VOP or an I-VOP, not a B-VOP. An I-VOP includes self-contained (e.g., inter-coded) blocks which are not predictive coded.

With forward prediction, the current MB is compared to a search area of MBs in the anchor frame to determine the best match. A corresponding motion vector (MV), known as a backward MV, describes the displacement of the current MB relative to the best match MB. Additionally, an advanced prediction mode for P-VOPs may be used, where motion compensation is performed on 8×8 blocks rather than 16×16 MBs. Moreover, both intra-frame and inter-frame coded P-VOP MBs can be coded in a frame mode or a field mode.

B-VOPs can use the forward prediction mode as described above in connection with P-VOPs as well as backward prediction, bi-directional prediction, and direct mode, which are all inter-frame techniques. B-VOPs do not currently use intra-frame coded MBs under MPEG-4 VM 8.0, although time is subject to change. The anchor frame (e.g., VOP) must be a P-VOP or I-VOP, not a B-VOP.

With backward prediction of B-VOPs, the current MB is compared to a search area of MBs in a temporally previous anchor frame to determine the best match. A corresponding MV, known as a forward MV), describes the relative displacement of the current MB relative to the best match MB. With bi-directional prediction of a B-VOP MB, the current MB is compared to a search area of MBs in both a temporally previous anchor frame and a temporally subsequent anchor frame to determine the best match MBs. Forward and backward MVs describe the displacement of the current MB relative to the best match MBs. Additionally, an averaged image is obtained from the best match MBs for use in encoding the current MB.

With direct mode prediction of B-VOPs, a MV is derived for an 8×8 block when the collocated MB in the following P-VOP uses the 8×8 advanced prediction mode. The MV of the 8×8 block in the P-VOP is linearly scaled to derive a MV for the block in the B-VOP without the need for searching to find a best match block.

The encoder, shown generally at 200, includes a shape coder 210, a motion estimation function 220, a motion compensation function 230, and a texture coder 240, which each receive video pixel data input at terminal 205. The motion estimation function 220, motion compensation function 230, texture coder 240, and shape coder 210 also receive VOP shape information input at terminal 207, such as the MPEG-4 parameter VOP_of_arbitrary_shape. When this parameter is zero, the VOP has a rectangular shape, and the shape coder 210 therefore is not used.

A reconstructed anchor VOP function 250 provides a reconstructed anchor VOP for use by the motion estimation function 220 and motion compensation function 230. A current VOP is subtracted from a motion compensated previous VOP at subtractor 260 to provide a residue which is encoded at the texture coder 240. The texture coder 240 performs the DCT to provide texture information (e.g., transform coefficients) to a multiplexer (MUX) 280. The texture code 240 also provides information which is summed with the output from the motion compensator 230 at a summer 270 for input to the previous reconstructed VOP function 250.

Motion information (e.g., motion vectors) is provided from the motion estimation function 220 to the MUX 280, while shape information which indicates the shape of the VOP is provided from the shape coding function 210 to the MUX 280. The MUX 280 provides a corresponding multiplexed data stream to a buffer 290 for subsequent communication over a data channel.

The pixel data which is input to the encoder may have a YUV 4:2:0 format. The VOP is represented by means of a bounding rectangle. The top left coordinate of the bounding rectangle is rounded to the nearest even number not greater than the top left coordinates of the tightest rectangle. Accordingly, the top left coordinate of the bounding rectangle in the chrominance component is one-half that of the luminance component.

Figure 3:
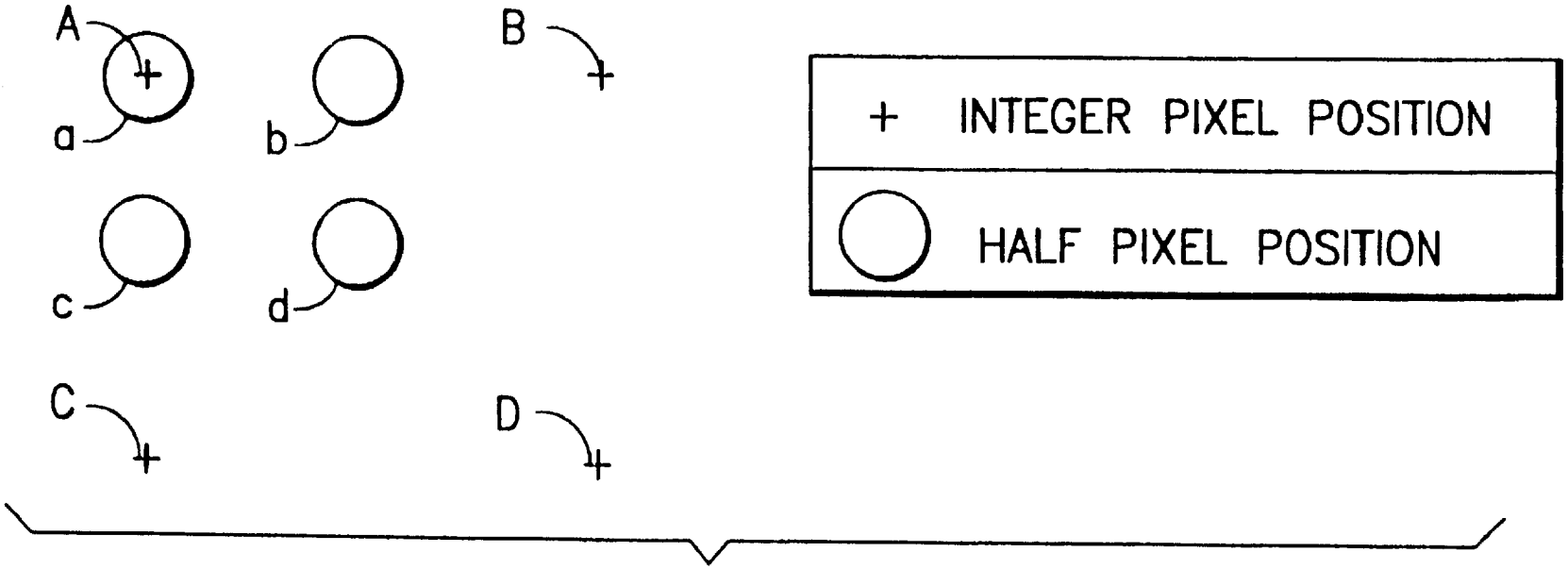
FIG. 3 illustrates an interpolation scheme for a half-pixel search.

FIG. 3 illustrates an interpolated scheme for a half-pixel search. Motion estimation and motion compensation (ME/MC) generally involve matching a block of a current video frame (e.g., a current block) with a block in a search area of a reference frame (e.g., a predicted block or reference block). For predictive (P) coded images, the reference block is in a previous frame. For bi-directionally predicted (B) coded images, predicted blocks in previous and subsequent frames may be used. The displacement of the predicted block relative to the current block is the motion vector (MV), which has horizontal (x) and vertical (y) components. Positive values of the MV components indicate that the predicted block is to the right of, and below, the current block.

A motion compensated difference block is formed by subtracting the pixel values of the predicted block from those of the current block point by point. Texture coding is then performed on the difference block. The coded MV and the coded texture information of the difference block are transmitted to the decoder. The decoder can then reconstruct an approximated current block by adding the quantized difference block to the predicted block according to the MV. The block for ME/MC can be a 16×16 frame block (macroblock), an 8×8 block or a 16×8 field block.

Accuracy of the MV is set at half-pixel. Interpolation must be used on the anchor frame so that p(i+x,j+y) is defined for x or y being half of an integer. Interpolation is performed as shown in FIG. 3. Integer pixel positions are represented by the symbol "+", as shown at A, B, C and D. Half-pixel positions are indicated by circles, as shown at a, b, c and d. As seen, a=A, b=(A+B)//2 c=(A+C)//2, and d=(A+B+C+D)//4, where "//" denotes rounded division. Further details of the interpolation are discussed in MPEG-4 VM 8.0 referred to previously as well as commonly assigned U.S. patent application Ser. No. 08/897,847 to Eifrig et al., filed Jul. 21, 1997, entitled "Motion Estimation and Compensation of Video Object Planes for Interlaced Digital Video", incorporated herein by reference.

Figure 6:
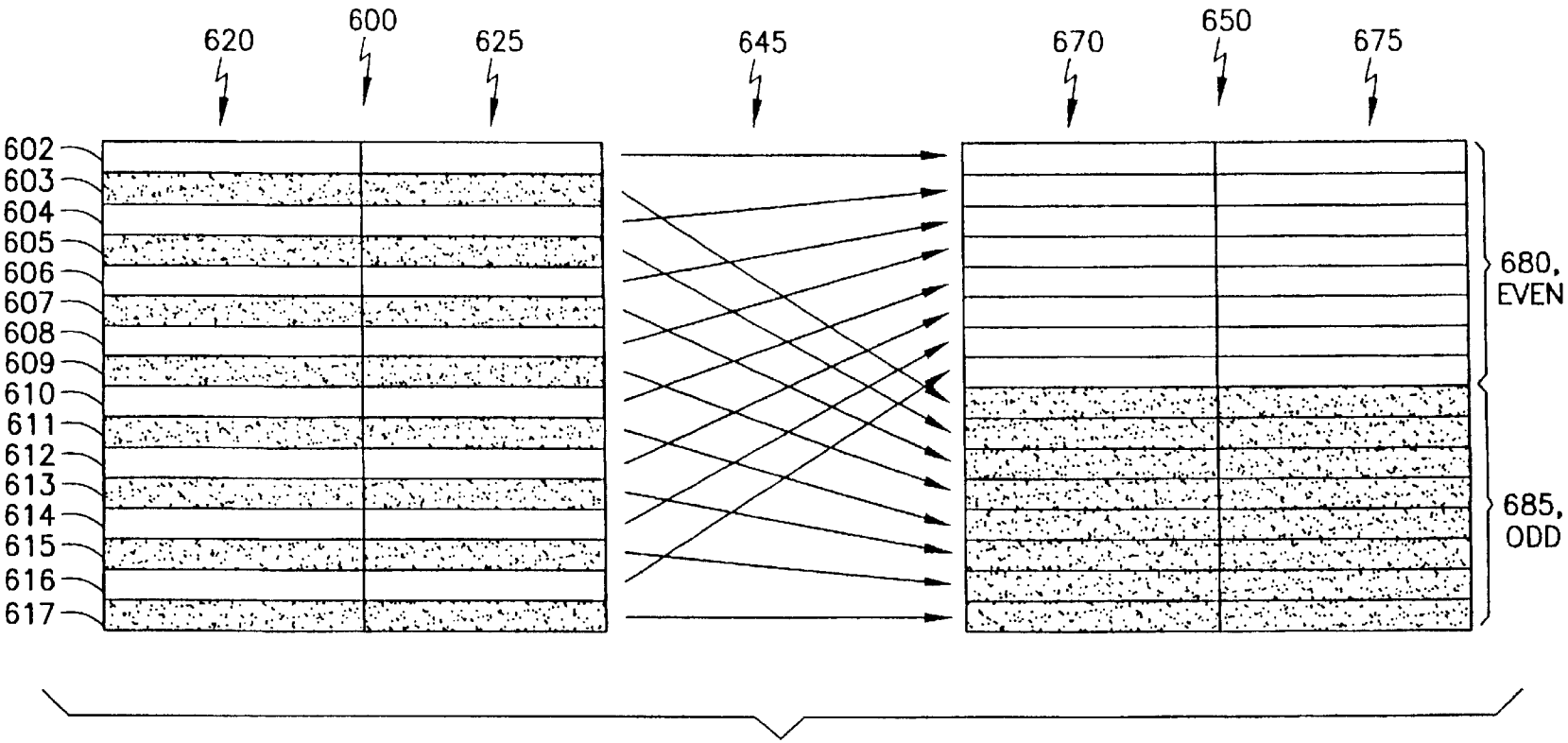
FIG. 6 illustrates reordering of pixel lines in an adaptive frame/field prediction scheme in accordance with the present invention.

FIG. 6 illustrates reordering of pixel lines in an adaptive frame/field prediction scheme in accordance with the present invention. In a first aspect of the advanced prediction technique, an adaptive technique is used to decide whether a current macroblock (MB) of 16×16 pixels should be ME/MC coded as is, or divided into four blocks of 8×8 pixels each, where each 8×8 block is ME/MC coded separately, or whether field based motion estimation should be used, where pixel lines of the MB are reordered to group the same-field lines in two 16×8 field blocks, and each 16×8 block is separately ME/MC coded.

A field mode 16×16 macroblock (MB), is shown generally at 600. The MB includes even-numbered lines 602, 604, 606, 608, 610, 612, 614 and 616, and odd-numbered lines 603, 605, 607, 609, 611, 613, 615 and 617. The even and odd lines are thus interleaved, and form top and bottom (or first and second) fields, respectively.

When the pixel lines in image 600 are permuted to form same-field luminance blocks, the MB shown generally at 650 is formed. Arrows, shown generally at 645, indicate the reordering of the lines 602–617. For example, the even line 602, which is the first line of MB 600, is also the first line of MB 650. The even line 604 is reordered as the second line in MB 650. Similarly, the even lines 606, 608, 610, 612, 614 and 616 are recorded as the third through eighth lines, respectively, of MB 650. Thus, a 16×8 luminance region 680 with even-numbered lines is formed. Similarly, the odd-numbered lines 603, 605, 607, 609, 611, 613, 615 and 617 form a 16×8 region 685.

The decision process for choosing the MC mode for P-VOPs is as follows. For frame mode video, first obtain the Sum of Absolute Differences (SAD) for a single 16×16 MB, e.g., $SAD_{16}(MV_x,MV_y)$; and for four 8×8 blocks, e.g., $SAD_{8\ (MVx1}$,$MV_{y1})$,$SAD_8(MV_{x2},MV_{y2})$,$SAD_8(MV_{x3},MV_{y3})$, and $SAD_8(MV_{x4},MV_{y4})$. If $$\sum_{i=1}^{4} SAD_8(MV_{xi}, MV_{yi}) < SAD_{16}(MV_x, MV_y) - 129.$$

choose 8×8 prediction; otherwise, choose 16×16 prediction. The constant "129" is obtained from Nb/2+1, where Nb is the number of non-transparent pixels in a MB.

For interlaced video, obtain $SAD_{top}(MV_{x_top},MV_{y_top})$, $SAD_{bottom}(MV_{x_bottom},MV_{y_bottom})$, where $(MV_{x_top}, MV_{y_top})$ and $(MV_{x_bottom}, MV_{y_bottom})$ are the motion vector (MV) for both top (even) and bottom (odd) fields. Then, choose the reference field which has the smallest SAD (e.g., for $SAD_{top}$ and $SAD_{bottom}$) from the field half sample search.

The overall prediction mode decision is based on choosing the minimum of:

(a) $SAD_{16}(MV_x,MV_y)$, $$\text{(b)}\ \sum_{i=1}^{4} SAD_8(MV_{xi}, MV_{yi}) + 129,$$

and (c) $SAD_{top}(MV_{x_top},MV_{y_top})+SAD_{bottom}(MV_{x_bottom}, MV_{y_bottom})+65$.

If term (a) is the minimum, 16×16 prediction is used. If term (b) is the minimum, 8×8 motion compensation (advanced prediction mode) is used. If term (c) is the minimum, field based motion estimation is used. The constant "65" is obtained from Nb/4+1.

If 8×8 prediction is chosen, there are four MVs for the four 8×8 luminance blocks, i.e., one MV for each 8×8 block. The MV for the two chrominance blocks is then obtained by taking an average of these four MVs and dividing the average value by two. Since each MV for the 8×8 luminance block has a half-pixel accuracy, the MV for the chrominance blocks may have a sixteenth pixel value. Table 1, below, specifies the conversion of a sixteenth pixel value to a half-pixel value for chrominance MVs. For example, 0 through 2/16 are rounded to 0, 3/16 through 13/16 are rounded to 1/2, and 14/16 and 15/16 are rounded to 2/2=1.

TABLE 1

| | | | | | | | | | | | | | | | | |
|---|---|---|---|---|---|---|---|---|---|---|---|---|---|---|---|---|
| 1/16 pixel value | 0 | 1 | 2 | 3 | 4 | 5 | 6 | 7 | 8 | 9 | 10 | 11 | 12 | 13 | 14 | 15 |
| 1/2 pixel value | 0 | 0 | 0 | 1 | 1 | 1 | 1 | 1 | 1 | 1 | 1 | 1 | 1 | 1 | 2 | 2 |

With field prediction, there are two MVs for the two 16×8 blocks. The luminance prediction is generated as follows. The even lines of the MB (e.g., lines 602, 604, 606, 608, 610, 612, 614 and 616) are defined by the top field MV using the reference field specified. The MV is specified in frame coordinates such that full pixel vertical displacements correspond to even integral values of the vertical MV coordinate, and a half-pixel vertical displacement is denoted by odd integral values. When a half-pixel vertical offset is specified, only pixels from lines within the same reference field are combined.

The MV for the two chrominance blocks is derived from the (luminance) MV by dividing each component by two, then rounding. The horizontal component is rounded by mapping all fractional values into a half-pixel offset. The vertical MV component is an integer and the resulting chrominance MV vertical component is rounded to an integer. If the result of dividing by two yields a non-integral value, it is rounded to the adjacent odd integer. Note that the odd integral values denote vertical interpolation between lines of the same field.

The second aspect of the advanced prediction technique is overlapped MC for luminance blocks, discussed in greater detail in MPEG-4 VM 8.0 and Eifrig et al. application referred to previously.

Specific coding techniques for B-VOPs are now discussed. For INTER coded VOPs such as B-VOPs, there are four prediction modes, namely, direct mode, interpolate (e.g., averaged or bi-directional) mode, backward mode, and forward mode. The latter three modes are non-direct modes. Forward only, or backward only prediction are also known as "unidirectional" prediction. The predicted blocks of the B-VOP are determined differently for each mode. Furthermore, blocks of a B-VOP and the anchor block(s) may be progressive (e.g., frame) coded or interlaced (e.g., field) coded.

A single B-VOP can have different MBs which are predicted with different modes. The term "B-VOP" only indicates that bi-directionally predicted blocks may be included, but this is not required. In contrast, with P-VOPs and I-VOPs, bi-directionally predicted MBs are not used.

For non-direct mode B-VOP MBs, MVs are coded differentially. For forward MVs in forward and bi-directional modes, and backward MVs in backward and bi-directional modes, the "same-type" MV (e.g., forward or backward) of the MB which immediately precedes the current MB in the same row is used as a predictor. This is the same as the immediately preceding MB in raster order, and generally, in transmission order. However, if the raster order differs from the transmission order, the MVs of the immediately preceding MB in transmission order should be used to avoid the need to store and re-order the MBs and corresponding MVs at the decoder.

Using the same-type MV, and assuming the transmission order is the same as the raster order, and that the raster order is from left to right, top to bottom, the forward MV of the left-neighboring MB is used as a predictor for the forward MV of the current MB of the B-VOP. Similarly, the backward MV of the left-neighboring MB is used as a predictor for the backward MV of the current MB of the B-VOP. The MVs of the current MB are then differentially encoded using the predictors. That is, the difference between the predictor and the MV which is determined for the current MB is transmitted as a motion vector difference to a decoder. At the decoder, the MV of the current MB is determined by recovering and adding the PMV and the difference MV.

In case the current MB is located on the left edge of the VOP, the predictor for the current MB is set to zero.

For interlaced-coded B-VOPs, each of the top and bottom fields have two associated prediction motion vectors, for a total of four MVs. The four prediction MVs represent, in transmission order, the top field forward and bottom field forward of the previous anchor MB, and the top field backward and bottom field backward of the next anchor MB. The current MB and the forward MB, and/or the current MB and the backward MB, may be separated by one or more intermediate images which are not used for ME/MC coding of the current MB. B-VOPs do not contain INTRA coded MBs, so each MB in the B-VOP will be ME/MC coded. The forward and backward anchor MBs may be from a P-VOP or I-VOP, and may be frame or field coded.

For interlaced, non-direct mode B-VOP MBs, four possible prediction motion vectors (PBVs) are shown in Table 2 below. The first column of Table 2 shows the prediction function, while the second column shows a designator for the PMV. These PMVs are used as shown in Table 3 below for the different MB prediction modes.

TABLE 2

| Prediction function | PMV type |
|---|---|
| Top field, forward | 0 |
| Bottom field, forward | 1 |
| Top field, backward | 2 |
| Bottom field, backward | 3 |

TABLE 3

| Macroblock mode | PMV type used |
|---|---|
| Frame, forward | 0 |
| Frame, backward | 2 |
| Frame, bi-directional | 0,2 |
| Field, forward | 0,1 |
| Field, backward | 2,3 |
| Field, bi-directional | 0,1,2,3 |

For example, Table 3 shows that, for a current field mode MB with a forward prediction mode (e.g., "Field, forward"), top field forward ("0") and bottom field forward ("1") motion vector predictors are used.

After being used in differential coding, the motion vectors of a current MB become the PMVs for a subsequent MB, in transmission order. The PMVs are reset to zero at the beginning of each row of MBs since the MVs of a MB at the end of a preceding row are unlikely to be similar to the MVs of a MB at the beginning of a current row. The predictors are also not used for direct mode MBs. For skipped MBs, the PMVs retain the last value.

With direct mode coding of B-VOP MBs, no vector differences are transmitted. Instead, the forward and backward MVs are directly computed at the decoder from the MVs of the temporally next P-VOP MB, with correction by a single delta MV, which is not predicted. The technique is efficient since less MV data is transmitted.

Table 4 below summarizes which PMVs are used to code the motion vectors of the current B-VOP MB based on the previous and current MB types. For B-VOPs, an array of prediction motion vectors, pmv[] may be provided which are indexed from zero to three (e.g., pmv[0], pmv[1], pmv[2] and pmv[3]). The indexes pmv[] are not transmitted, but the decoder can determine the pmv[] index to use according to the MV coding type and the particular vector being decoded. After coding a B-VOP MP, some of the PMVs vectors are updated to be the same as the motion vectors of the current MB. The first one, two or four PMVs are updated depending on the number of MVs associated with the current MB.

For example, a forward, field predicted MB has two motion vectors, where pmv[0] is the PMV for the top field, forward, and pmv[1] is the PMV for the bottom field, forward. For a backward, field predicted MB, pmv[2] is the PMV for the top field backward, and pmv[3] is the PMV for the bottom field, backward. For a bi-directional, field predicted MB, pmv[0] is the PMV for the top field, forward, pmv[1] is the PMV for the bottom field forward, pmv[2] is the PMV for the top field backward, and pmv[3] is the PMV for the bottom field backward. For a forward or backward predicted frame mode B-VOP MB, there is only one MV, so only pmv[0] is used for forward, and pmv[2] is used for backward. For an average (e.g., bi-directionally) predicted frame mode B-VOP MB, there are two MVs, namely, pmv[0] for the forward MV, and pmv[2] for the backward MV. The row designated "pmv[]'s to update" indicates whether one, two or four MVs are updated.

TABLE 4

| | Prediction Motion Vector Index pmv[ ] | | | | | | |
|---|---|---|---|---|---|---|---|
| | Current Macroblock type | | | | | | |
| Previous Macroblock type in transmission order | Direct | Forward, Frame Mode | Backward, Frame Mode | Average, Frame Mode | Forward, Field Mode | Backward, Field Mode | Average, Field Mode |
| pmv[ ]'s to update | none | 0,1 | 2,3 | 0,1,2,3 | 0,1 | 2,3 | 0,1,2,3 |
| pmv[ ]'s to use | none | 0 | 2 | 0,2 | 0,1 | 2,3 | 0,1,2,3 |

It will be appreciated that Table 4 is merely a shorthand notation for implementing the technique of the present invention for selecting a prediction MV for a current MB. However, the scheme may be expressed in various other ways.

Intra block DC adaptive prediction can use the same algorithm as described in MPEG-4 VM 8.0 regardless of value of dct_type. Intra block adaptive AC prediction is performed as described in MPEG-4 VM 8.0 except when the first row of coefficients is to be copied from the coded block above. This operation is allowed only if dct_type has the same value for the current MB and the block above. If the dct_types differ, then AC prediction can occur only by copying the first column from the block to the left. If there is no left block, zero is used for the AC predictors.

Figure 4:
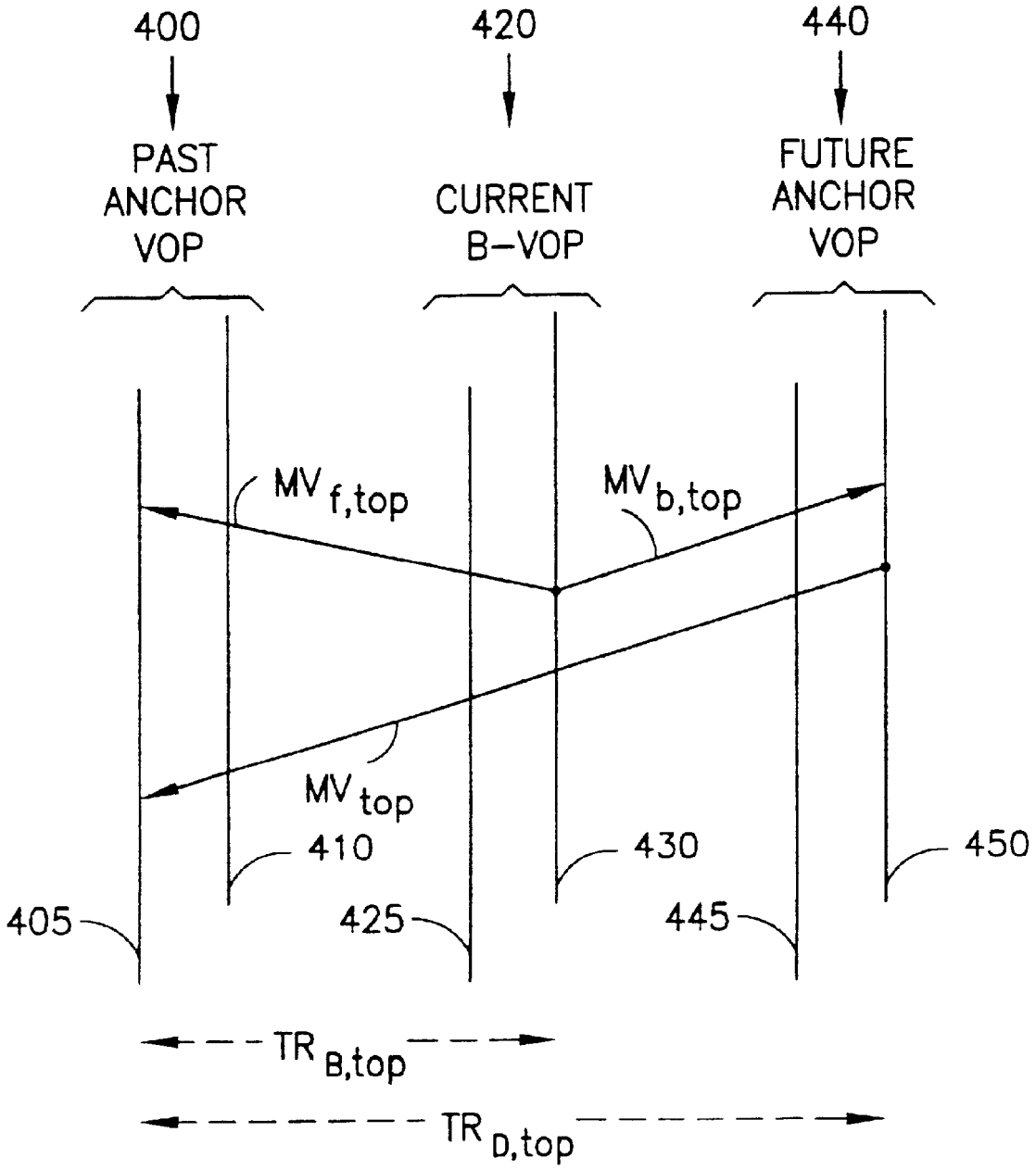
FIG. 4 illustrates direct mode coding of the top field of an interlaced-coded B-VOP in accordance with the present invention.

FIG. 4 illustrates direct mode coding of the top field of an interlaced-coded B-VOP in accordance with the present invention. Progressive direct coding mode is used for the current macroblock (MB) whenever the MB in a future anchor picture which is at the same relative position (e.g., co-sited) as the current MB is coded as (1) a 16×16 (frame) MB, (2) an intra MB or (3) an 8×8 (advanced prediction) MB.

The direct mode prediction is interlaced whenever the co-sited future anchor picture MB is coded as an interlaced MB. Direct mode will be used to code the current MB if its biased SAD is the minimum of all B-VOP MB predictors. Direct mode for an interlaced coded MB forms the prediction MB separately for the top and bottom fields of the current MB. The four field motion vectors (MVs) of a bi-directional field motion compensated MB (e.g., top field forward, bottom field forward, top field backward, and bottom field backward) are calculated directly from the respective MVs of the corresponding MB of the future anchor point.

The technique is efficient since the required searching is significantly reduced, and the amount of transmitted MV data is reduced. Once the MVs and reference field are determined, the current MB is considered to be a bi-directional field predicted MB. Only one delta motion vector (used for both fields) occurs in the bitstream for the field predicted MB.

The prediction for the top field of the current MB is based on the top field MV of the MB of the future anchor picture (which can be a P-VOP, or an I-VOP with MV=0), and a past reference field of a previous anchor picture which is selected by the corresponding MV of the top field of the future anchor MB. That is, the top field MB of the future anchor picture which is correspondingly positioned (e.g., co-sited) to the current MB has a best match MB in either the top or bottom field of the past anchor picture. This best match MB is then used as the anchor MB for the top field of the current MB. An exhaustive search is used to determine the delta motion vector $MV_D$ given the co-sited future anchor MV on a MB by MB basis.

Motion vectors for the bottom field of the current MB are similarly determined using the MV of the correspondingly positioned bottom field of the future anchor MB, which in turn references a best match MB in the top or bottom field of the past anchor picture.

Essentially, the top field motion vector is used to construct an MB predictor which is the average of (a) pixels obtained from the top field of the correspondingly positioned future anchor MB and (b) pixels from the past anchor field referenced by the top field MV of the correspondingly positioned future anchor MB. Similarly, the bottom field motion vector is used to construct a MB predictor which is the average of (a) pixels obtained from the bottom field of the correspondingly positioned future anchor MB and (b) pixels from the past anchor field referenced by the bottom field MV of the correspondingly positioned future anchor MB.

As shown in FIG. 4, the current B-VOP MB 420 includes a top field 430 and bottom field 425, the past anchor VOP MB 400 includes a top field 410 and bottom field 405, and the future anchor VOP MB 440 includes a top field 450 and bottom field 445.

The motion vector $MV_{top}$ is the forward motion vector for the top field 450 of the future anchor MB 440 which indicates the best match MB in the past anchor MB 400. Even though $MV_{top}$ is referencing a previous image (e.g., backward in time), it is a forward MV since the future anchor VOP 440 is forward in time relative to the past anchor VOP 400. In the example, $MV_{top}$ references the bottom field 405 of the past anchor MB 400, although either the top 410 or bottom 405 field could be referenced. $MV_{f,top}$ is the forward MV of the top field of the current MB, and $MV_{b,top}$ is the backward MV of the top field of the current MB. Pixel data is derived for the bi-directionally predicted MB at a decoder by averaging the pixel data in the future and past anchor images which are identified by $MV_{b,top}$ and $MV_{f,top}$, respectively, and Gumming the averaged image with a residue which was transmitted.

The motion vectors for the top field are calculated as follows:

$$MV_{f,top}=(TR_{B,top}*MV_{top})/TR_{D,top}+MV_D;$$

$$MV_{b,top}=((TR_{B,top}-TR_{D,top})*MV_{top})/TR_{D,t} \text{ if } MV_D=0;$$

and $$MV_{b,top}=(MV_{f,top}-MV_{top}) \text{ if } MV_D\neq 0.$$

$MV_D$ is a delta, or offset, motion vector. Note that the motion vectors are two-dimensional. Additionally, the motion vectors are integral half-pixel luma motion vectors. The slash "/" denotes truncate toward zero integer division. Also, the future anchor VOP is always a P-VOP for field direct mode. If the future anchor was an I-VOP, the MV would be zero and 16×16 progressive direct mode would be used. $TR_{B,top}$ is the temporal distance in fields between the past reference field (e.g., top or bottom), which is the bottom field 405 in this example, and the top field 430 of the current B-VOP 420. $TR_{D,top}$ is the temporal distance between the past reference field (e.g., top or bottom), which is the bottom field 405 in this example, and the future top reference field 450.

Figure 5:
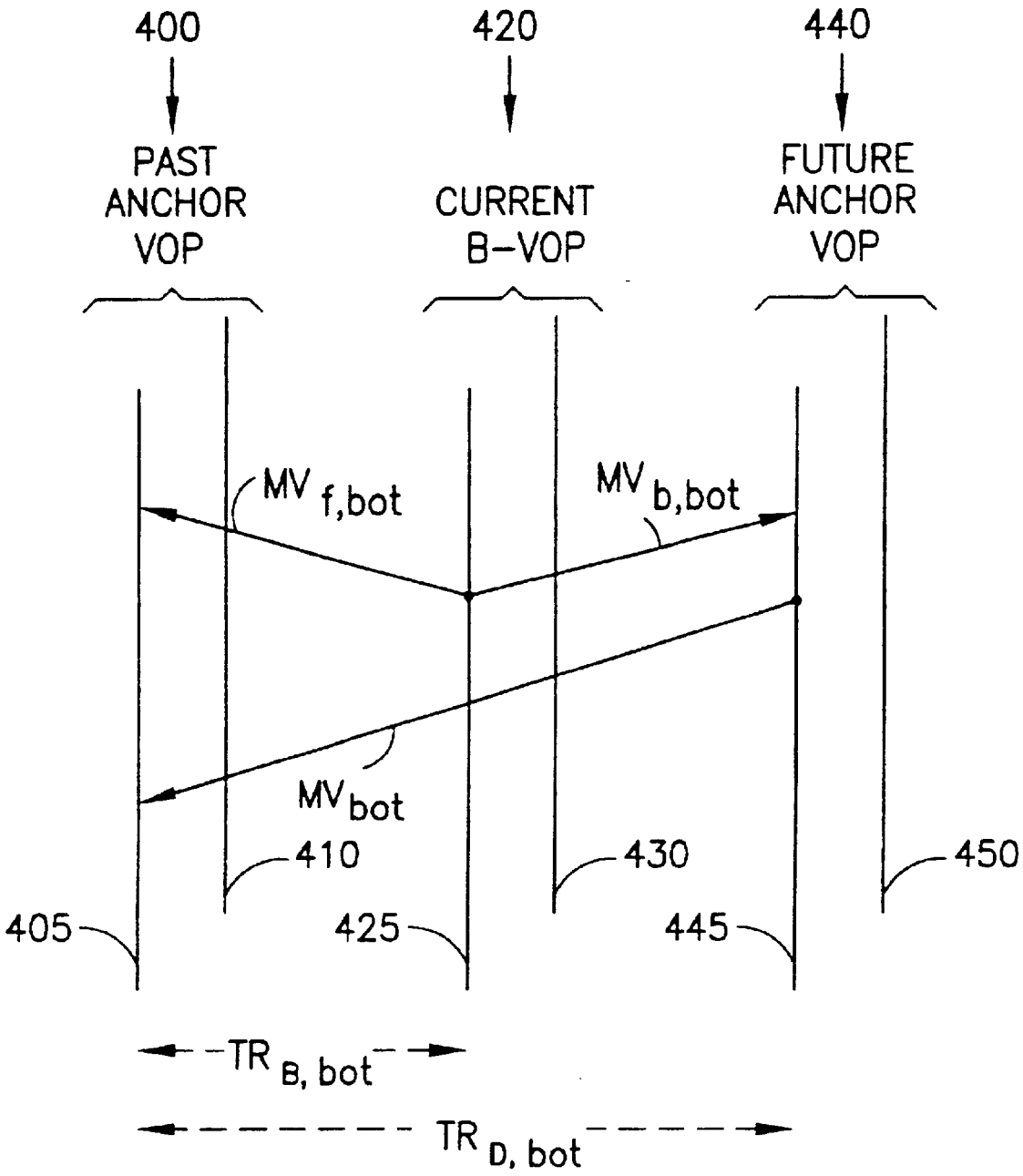
FIG. 5 illustrates direct mode coding of the bottom field of an interlaced-coded B-VOP in accordance with the present invention.

FIG. 5 illustrates direct mode coding of the bottom field of an interlaced-coded B-VOP in accordance with the present invention. Note that the source interlaced video can have a top field first or bottom field first format. A bottom field first format is shown in FIGS. 4 and 5. Like-numbered elements are the same as in FIG. 4. Here, the motion vector $MV_{bot}$ is the forward motion vector for the bottom field 445 of the future anchor macroblock (MB) 440 which indicates the best match MB in the past anchor MB 400. In the example, $MV_{bot}$ references the bottom field 405 of the past anchor MB 400, although either the top 410 of bottom 405 field could be used. $MV_{f,bot}$ and $MV_{b,bot}$ are the forward and backward motion vectors, respectively.

The motion vectors for the bottom field are calculated in a parallel manner to the top field motion vectors, as follows:

$$MV_{f,bot}=(TR_{B,bot}*MV_{bot})/TR_{D,bot}+MV_D;$$

$$MV_{b,bot}=((TR_{B,bot}-TR_{D,bot})*MV_{bot})/TR_{D,1} \text{ if } MV_D=0;$$

and $$MV_{b,bot}=(MV_{f,bot}-MV_{bot}) \text{ if } MV_D\neq 0.$$

$TR_{B,bot}$ is the temporal distance between the past reference field (e.g., top or bottom), which is the bottom field 405 in this example, and the bottom field 425 of the current B-VOP 420. $TR_{D,bot}$ is the temporal distance between the past reference field (e.g., top or bottom), which is the bottom field 405 in this example, and the future bottom reference field 445.

Regarding the examples of FIGS. 4 and 5, the calculation of $TR_{B,top}$, $TR_{D,top}$, $TR_{B,bot}$ and $TR_{D,bot}$ depends not only on the current field, reference field, and frame temporal references, but also on whether the current video is top field first or bottom field first. In particular, $$TR_{D,top} \text{ or } TR_{D,bot}=2*(TR_{future}-TR_{past})+\delta;$$

and $$TR_{B,top} \text{ or } TR_{B,bot}=2*(TR_{current}-TR_{past})+\delta;$$

where $TR_{future}$, $TR_{current}$, and $TR_{past}$ are the frame number of the future, current and past frames, respectively, in display order, and δ, an additive correction to the temporal distance between fields, is given by Table 5, below. δ has units of field periods.

For example, the designation "1" in the last row of the first column indicates that the future anchor field is the top field, and the referenced field is the bottom field. This is shown in FIG. 4. The designation "1" in the last row of the second column indicates that the future anchor field is the bottom field, and the referenced field is also the bottom field. This is shown in FIG. 5.

TABLE 5

| Temporal correction. δ | | | | | |
|---|---|---|---|---|---|
| Referenced Field | | Bottom Field | | | |
| Future | Future | First | | Top Field First | |
| Anchor = top | Anchor = bottom | Top Field δ | Bottom Field δ | Top Field δ | Bottom Field δ |
| top | top | 0 | −1 | 0 | 1 |
| top | bottom | 0 | 0 | 0 | 0 |
| bottom | top | 1 | −1 | −1 | 1 |
| bottom | bottom | 1 | 0 | −1 | 0 |

For efficient coding, an appropriate coding mode decision process is required. As indicated, for B-VOPs, a MB can be coded using (1) direct coding, (2) 16×16 motion compensated (includes forward, backward and averaged modes), or (3) field motion compensation (includes forward, backward and averaged modes). Frame or field direct coding of a current MB is used when the corresponding future anchor MB is frame or field direct coded, respectively.

For a field motion compensated MB in a B-VOPs, a decision is made to code the MB in a forward, backward, or averaged mode based on the minimum luminance half-pixel SADs with respect to the decoded anchor pictures. Specifically, seven biased SAD terms are calculated as follows:

(1) $SAD_{direct}+b_1$, (2) $SAD_{forward}+b_2$, (3) $SAD_{backward}+b_2$, (4) $SAD_{average}+b_3$, (5) $SAD_{forward,field}+b_3$, (6) $SAD_{backward,field}+b_3$, and (7) $SAD_{average,field}+b_4$, where the subscripts indicate direct mode, forward motion prediction, backward motion prediction, average (i.e., interpolated or bi-directional) motion prediction, frame mode (i.e., locally progressive) and field mode (i.e., locally interlaced). The field SADs above (i.e., $SAD_{forward,field}$, $SAD_{backward,field}$, and $SAD_{average,field}$) are the sums of the top and bottom field SADs, each with its own reference field and motion vector. Specifically, $$SAD_{forward,field}=SAD_{forward,top\ field}+SAD_{forward,bottom\ field};$$

$$SAD_{backward,field}=SAD_{backward,top\ field}+SAD_{backward,bottom\ field}; \text{ and}$$

$$SAD_{average,field}=SAD_{average,top\ field}+SAD_{average,bottom\ field}.$$

$SAD_{direct}$ is the best direct mode prediction, $SAD_{forward}$ is the best 16×16 prediction from the forward (past) reference, $SAD_{backward}$ is the best 16×16 prediction from the backward (future) reference, $SAD_{average}$ is the best 16×16 prediction formed by a pixel-by-pixel average of the best forward and best backward reference, $SAD_{forward,field}$ is the best field prediction from the forward (past) reference, $SAD_{backward,field}$ is the best field prediction from the backward (future) reference, and $SAD_{average,field}$ is the best field prediction formed by a pixel-by-pixel average of the best forward and best backward reference.

The $b_i$'s are bias values as defined in Table 6, below, to account for prediction modes which require more motion vectors. Direct mode and modes with fewer MVs are favored.

TABLE 6

| Mode | Number of motion vectors | $b_1$ | Bias | Value |
|---|---|---|---|---|
| Direct | 1 | $b_1$ | −(Nb/2 + 1) | −129 |
| Frame, forward | 1 | $b_2$ | 0 | 0 |
| Frame, backward | 1 | $b_2$ | 0 | 0 |
| Frame, average | 2 | $b_3$ | (Nb/4 + 1) | 65 |
| Field, forward | 2 | $b_3$ | (Nb/4 + 1) | 65 |
| Field, backward | 2 | $b_3$ | (Nb/4 + 1) | 65 |
| Field, average | 4 | $b_4$ | (Nb/2 + 1) | 129 |

The negative bias for direct mode is for consistency with the existing MPEG-4 VM for progressive video, and may result in relatively more skipped MBs.

Figure 7:
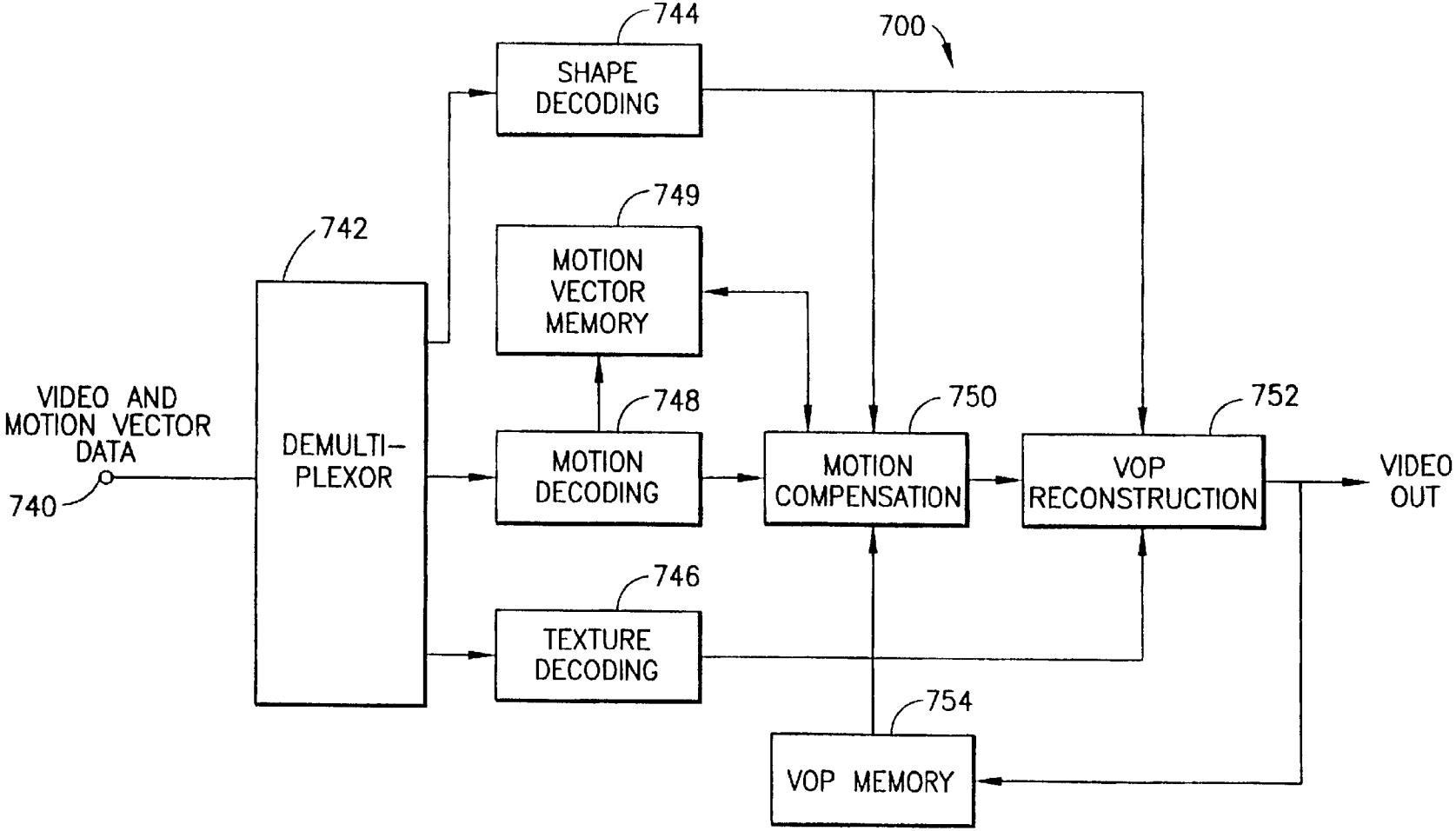
FIG. 7 is a block diagram of a decoder in accordance with the present invention.

FIG. 7 is a block diagram of a decoder in accordance with the present invention. The decoder, shown generally at 700, can be used to receive and decode the encoded data signals transmitted from the encoder of FIG. 2. The encoded video image data and differentially encoded motion vector (MV) data are received at terminal 740 and provided to a demultiplexer (DEMUX) 742. The encoded video image data is typically differentially encoded in DCT transform coefficients as a prediction error signal (e.g., residue).

A shape decoding function 744 processes the data when the VOP has an arbitrary shape to recover shape information, which is, in turn, provided to a motion compensation function 750 and a VOP reconstruction function 752. A texture decoding function 746 performs an inverse DCT on transform coefficients to recover residue information. For INTRA coded macroblocks (MBs), pixel information is recovered directly and provided to the VOP reconstruction function 752.

For INTER coded blocks and MBs, such as those in B-VOPs, the pixel information provided from the texture decoding function 746 to the reconstructed VOP function 752 represents a residue between the current MB and a reference image. The reference image may be pixel data from a single anchor MB which is indicated by a forward or backward MV. Alternatively, for an interpolated (e.g., averaged) MB, the reference image is an average of pixel data from two reference MBs, e.g., one past anchor MB and one future anchor MB. In this case, the decoder must calculate the averaged pixel data according to the forward and backward MVs before recovering the current MB pixel data.

For INTER coded blocks and MBs, a motion decoding function 748 processes the encoded MV data to recover the differential MVs and provide them to the motion compensation function 750 and to a motion vector memory 749, such as a RAM. The motion compensation function 750 receives the differential MV data and determines a reference motion vector (e.g., predictor motion vector, or PMV) in accordance with the present invention. The PMV is determined according to the coding mode (e.g., forward, backward, bi-directional, or direct).

Once the motion compensation function 750 determines a full reference MV and sums it with the differential MV of the current MB, the full MV of the current MB is available. Accordingly, the motion compensation function 750 can now retrieve anchor frame best match data from a VOP memory 754, such as a RAM, calculate an averaged image if required, and provide the anchor frame pixel data to the VOP reconstruction function to reconstruct the current MB.

The retrieved or calculated best match data is added back to the pixel residue at the VOP reconstruction function 752 to obtain the decoded current MB or block. The reconstructed block is output as a video output signal and also provided to the VOP memory 754 to provide new anchor frame data. Note that an appropriate video data buffering capability may be required depending on the frame transmission and presentation orders since an anchor frame for a B-VOP MB may be a temporally future frame or field, in presentation order.

Figure 8:
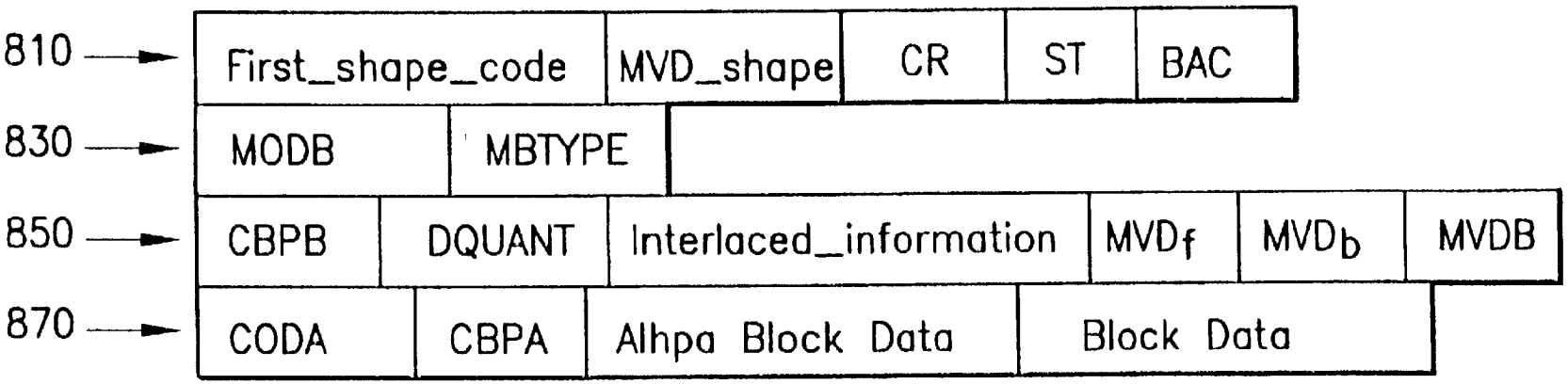
FIG. 8 illustrates a macroblock layer structure in accordance with the present invention.

FIG. 8 illustrates a MB packet structure in accordance with the present invention. The structure is suitable for B-VOPs, and indicates the format of data received by the decoder. Note that the packets are shown in four rows for convenience only. The packets are actually transmitted serially, starting from the top row, and from left to right within a row. The first row 810 includes fields first_shape_code, MVD_shape, CR, ST and BAC. A second row 830 includes fields MODB and MBTYPE. A third row 850 includes fields CBPB, DQUANT, Interlaced_information, $MVD_f$, $MVD_b$, and MVDB. A fourth row includes fields CODA, CBPBA, Alpha Block Data and Block Data. Each of the above fields is defined according to MPEG-4 VM 8.0.

first_shape_code indicates whether a MB is in a bounding box of a VOP. CR indicates a conversion ratio for Binary Alpha Blocks. ST indicates a horizontal or vertical scan order. BAC refers to a binary arithmetic codeword.

MODB, which indicates the mode of a MB, is present for every coded (non-skipped) MB in a B-VOP. Difference motion vectors ($MVD_f$, $MVD_b$, or MVDB) and CBPB are present if indicated by MODB. Macroblock type is indicated by MBTYPE, which also signals motion vector modes (MVDs) and quantization (DQUANT). With interlaced mode, there can be up to four MVs per MB. MBTYPE indicates the coding type, e.g., forward, backward, bi-directional or direct. CBPB is the Coded Block Pattern for a B-type macroblock. CBPBA is similarly defined as CBPB except that it has a maximum of four bits. DQUANT defines changes in the value of a quantizer.

The field Interlaced_information in the third row 850 indicates whether a MB is interlaced coded, and provides field MV reference data which informs the decoder of the coding mode of the current MB or block. The decoder uses this information in calculating the MV for a current MB. The Interlaced_information field may be stored for subsequent use as required in the MV memory 749 or other memory in the decoder.

The Interlaced_information field may also include a flag dct_type which indicates whether top and bottom field pixel lines in a field coded MB are reordered from the interleaved order, as discussed above in connection with FIG. 6.

The MB layer structure shown is used when VOP_prediction_type=10. If COD indicates skipped (COD="1") for MB in the most recently decoded I- or P-VOP then the co-located (e.g., co-sited) MB in the B-VOP is also skipped. That is, no information is included in the bitstream.

$MVD_f$ is the motion vector of a MB in B-VOP with respect to a temporally previous reference VOP (an I- or a P-VOP). It consists of a variable length codeword for the horizontal component followed by a variable length codeword for the vertical component. For an interlaced B-VOP MB with field_prediction of "1" and MBTYPE of forward or interpolate, $MVD_f$ represents a pair of field motion vectors (top field followed by bottom field) which reference the past anchor VOP.

$MVD_b$ is the motion vector of a MB in B-VOP with respect to temporally following reference VOP (an I- or a P-VOP). It consists of a variable length codeword for the horizontal component followed by a variable length codeword for the vertical component. For an interlaced B-VOP MB with field_prediction of "1" and MBTYPE of backward or interpolate, $MVD_b$ represents a pair of field MVs (top field followed by bottom field) which reference the future anchor VOP.

MVDB is only present in B-VOPs if direct mode is indicated by MODB and MBTYPE, and consists of a variable length codeword for the horizontal component followed by a variable length codeword for the vertical component of each vector. MVDBs represents delta vectors that are used to correct B-VOP MB motion vectors which are obtained by scaling P-VOP MB motion vectors.

CODA refers to gray scale shape coding.

The arrangement shown in FIG. 8 is an example only and that various other arrangements for communicating the relevant information to the decoder will become apparent to those skilled in the art.

A bitstream syntax and MB layer syntax for use in accordance with the present invention is described in MPEG-4 VM 8.0 as well as the Eifrig et al. application referred to previously.

Accordingly, it can be seen that the present invention provides a scheme for encoding a current MB in a B-VOP, in particular, when the current MB is field coded, and/or an anchor MB is field coded. A scheme for direct coding for a field coded MB is presented, in addition to a coding decision process which uses the minimum of sum of absolute differences terms to select an optimum mode. A prediction motion vector (PMV) is also provided for the top and bottom field of a field coded current MB, including forward and backward PMVs as required, as well as for frame coded MBs.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for calculating direct mode motion vectors for a current bi-directionally predicted, field coded image having top and bottom fields, in a sequence of digital video images, comprising the steps of:

determining a past field coded reference image having top and bottom fields, and a future field coded reference image having top and bottom fields;

wherein the future image is predicted using the past image such that $MV_{top}$, a forward motion vector of the top field of the future image, references one of the top and bottom fields of the past image, and $MV_{bot}$, a forward motion vector of the bottom field of the future image, references one of the top and bottom fields of said past image; and determining forward and backward motion vectors for predicting at least one of the top and bottom fields of the current image by scaling the forward motion vector of the corresponding field of the future image.

2. The method of claim 1, wherein:

$MV_{f,top}$, the forward motion vector for predicting the top field of the current image is determined according to the expression $(MV_{top}*TR_{B,top})/TR_{D,top}+MV_D$;

where $TR_{B,top}$ corresponds to a temporal spacing between the top field of the current image and the field of the past image which is referenced by $MV_{top}$, $TR_{D,top}$ corresponds to a temporal spacing between the top field of the future image and the field of the past image which is referenced by $MV_{top}$, and $MV_D$ is a delta motion vector.

3. The method of claim 2, wherein:

$MV_{f,top}$ is determined using integer division with truncation toward zero; and $MV_{top}$ and $MV_{bot}$ are integer half-luma pel motion vectors.

4. The method of claim 2, wherein:

$TR_{B,top}$ and $TR_{D,top}$ incorporate a temporal correction which accounts for whether said current field coded image is top field first or bottom field first.

5. The method of claim 1, wherein:

$MV_{f,bot}$, the forward motion vector for predicting the bottom field of the current image is determined according to the expression $(MV_{bot}*TR_{B,bot})/(TR_{D,bot}+MV_D$;

where $TR_{B,bot}$ corresponds to a temporal spacing between the bottom field of the current image and the field of the past image which is referenced by $MV_{bot}$, $TR_{D,bot}$ corresponds to a temporal spacing between the bottom field of the future image and the field of the past image which is referenced by $MV_{bot}$, and $MV_D$ is a delta motion vector.

6. The method of claim 5, wherein:

$MV_{f,bot}$ is determined using integer division with truncation toward zero; and $MV_{top}$ and $MV_{bot}$ are integer half-luma pel motion vectors.

7. The method of claim 5, wherein:

$TR_{B,bot}$ and $TD_{D,bot}$ incorporate a temporal correction which accounts for whether said current field coded image is top field first or bottom field first.

8. The method of claim 1, wherein:

$MV_{b,top}$, the backward motion vector for predicting the top field of the current image is determined according to one of the equations (a) $MV_{b,top}=((TR_{B,top}-TR_{D,top})*MV_{top})/TR_{D,top}$ and (b) $MV_{b,top}=MV_{f,top}-MV_{top}$;

where $TR_{B,top}$ corresponds to a temporal spacing between the top field of the current image and the field of the past image which is referenced by $MV_{top}$, $TR_{D,top}$ corresponds to a temporal spacing between the top field of the future image and the field of the past image which is referenced by $MV_{top}$, and $MV_{f,top}$ is the forward motion vector for predicting the top field of the current image.

9. The method of claim 8, wherein:

said equation (a) is selected when a delta motion vector $MV_D=0$, and said equation (b) is selected when $MV_D\neq 0$.

10. The method of claim 1, wherein:

$MV_{b,bot}$, the backward motion vector for predicting the bottom field of the current image is determined according to one of the equations (a) $MV_{b,bot}=((TR_{B,bot}-TR_{D,bot})*MV_{bot})/TR_{D,bot}$ and (b) $MV_{b,bot}=MV_{f,bot}-MV_{bot}$;

where $TR_{B,bot}$ corresponds to a temporal spacing between the bottom field of the current image and the field of the past image which is referenced by $MV_{bot}$, $TR_{D,bot}$ corresponds to a temporal spacing between the bottom field of the future image and the field of the past image which is referenced by $MV_{bot}$, and $MV_{f,bot}$ is the forward motion vector for predicting the bottom field of the current image.

11. The method of claim 10, wherein:

said equation (a) is selected when a delta motion vector $MV_D=0$, and said equation (b) is selected when $MV_D\neq 0$.

12. A method for selecting a coding mode for a current predicted, field coded macroblock having top and bottom fields, in a sequence of digital video images, comprising the steps of:

determining a forward sum of absolute differences error, $SAD_{forward,field}$ for the current macroblock relative to a past reference macroblock, which corresponds to a forward coding mode;

determining a backward sum of absolute differences error, $SAD_{backward,field}$ for the current macroblock relative to a future reference macroblock, which corresponds to a backward coding mode;

determining an average sum of absolute differences error, $SAD_{average,field}$ for the current macroblock relative to an average of said past and future reference macroblocks, which corresponds to an average coding mode; and selecting said coding mode according to the minimum of said SADs.

13. The method of claim 12, comprising the further step of:

selecting said coding mode according to the minimum of respective sums of said SADs with corresponding bias terms which account for the number of required motion vectors of the respective coding modes.

14. The method of claim 12, wherein:

$SAD_{forward,field}$ is determined according to a sum of: (a) a sum of absolute differences for the top field of the current macroblock relative to a top field of the past reference macroblock, and (b) a sum of absolute differences for the bottom field of the current macroblock relative to a bottom field of the past reference macroblock.

15. The method of claim 12, wherein:

$SAD_{backward,field}$ is determined according to a sum of: (a) a sum of absolute differences for the top field of the current macroblock relative to a top field of the future reference macroblock, and (b) a sum of absolute differences for the bottom field of the current macroblock relative to a bottom field of the future reference macroblock.

16. The method of claim 12, wherein:

$SAD_{average,field}$ is determined according to a sum of: (a) a sum of absolute differences for the top field of the current macroblock relative to an average of the top fields of the past and future reference macroblocks, and (b) a sum of absolute differences for the bottom field of the current macroblock relative to an average of the bottom fields of the past and future reference macroblocks.

17. A decoder for recovering a current, direct mode, field coded macroblock having top and bottom fields in a sequence of digital video macroblocks from a received bitstream, wherein said current macroblock is bi-directionally predicted using a past field coded reference macroblock having top and bottom fields, and a future field coded reference macroblock having top and bottom fields, comprising:

means for recovering $MV_{top}$, a forward motion vector of the top field of the future macroblock which references one of the top and bottom fields of the past macroblock, and $MV_{bot}$, a forward motion vector of the bottom field of the future macroblock which references one of the top and bottom fields of said past macroblock; and means for determining forward and backward motion vectors for predicting at least one of the top and bottom fields of the current macroblock by scaling the forward motion vector of the corresponding field of the future macroblock.

18. The decoder of claim 17, further comprising:

means for determining $MV_{f,top}$, the forward motion vector for predicting the top field of the current macroblock, according to the expression $(MV_{top}*TR_{B,top})/TR_{D,top}+MV_D$;

where $TR_{B,top}$ corresponds to a temporal spacing between the top field of the current macroblock and the field of the past macroblock which is referenced by $MV_{top}$, $TR_{D,top}$ corresponds to a temporal spacing between the top field of the future macroblock and the field of the past macroblock which is referenced by $MV_{top}$, and $MV_D$ is a delta motion vector.

19. The decoder of claim 18, wherein:

$MV_{f,top}$ is determined using integer division with truncation toward zero; and $MV_{top}$ and $MV_{bot}$ are integer half-luma pel motion vectors.

20. The decoder of claim 18, wherein:

$TR_{B,top}$ and $TR_{D,top}$ incorporate a temporal correction which accounts for whether said current field coded image is top field first or bottom field first.

21. The decoder of claim 17, further comprising:

means for determining $MV_{f,bot}$, the forward motion vector for predicting the bottom field of the current macroblock, according to the expression $(MV_{bot}*TR_{B,bot})TR_{D,bot}+MV_D$;

where $TR_{B,bot}$ corresponds to a temporal spacing between the bottom field of the current macroblock and the field of the past macroblock which is referenced by $MV_{bot}$, $TR_{D,bot}$ corresponds to a temporal spacing between the bottom field of the future macroblock and the field of the past macroblock which is referenced by $MV_{bot}$, and $MV_D$ is a delta motion vector.

22. The decoder of claim 21, wherein:

$MV_{f,bot}$ is determined using integer division with truncation toward zero; and $MV_{top}$ and $MV_{bot}$ are integer half-luma pel motion vectors.

23. The decoder of claim 21, wherein:

$TR_{B,bot}$ and $TR_{D,bot}$ incorporate a temporal correction which accounts for whether said current field coded image is top field first or bottom field first.

24. The decoder of claim 17, further comprising:

means for determining $MV_{b,top}$, the backward motion vector for predicting the top field of the current macroblock, according to one of the equations (a) $MV_{b,top}=((TR_{B,top}-TR_{D,top})*MV_{top})/TR_{D,top}$ and (b) $MV_{b,top}=MV_{f,top}-MV_{top}$;

where $TR_{B,top}$ corresponds to a temporal spacing between the top field of the current macroblock and the field of the past macroblock which is referenced by $MV_{top}$, $TR_{D,top}$ corresponds to a temporal spacing between the top field of the future macroblock and the field of the past macroblock which is referenced by $MV_{top}$, and $MV_{f,top}$ is the forward motion vector for predicting the top field of the current macroblock.

25. The decoder of claim 24, further comprising:

means for selecting said equation (a) when a delta motion vector $MV_D=0$; and means for selecting said equation (b) when $MV_D\neq 0$.

26. The decoder of claim 17, further comprising:

means for determining $MV_{b,bot}$ the backward motion vector for predicting the bottom field of the current macroblock, according to one of the equations (a) $MV_{b,bot}=((TR_{B,bot}-TR_{D,bot})*MV_{bot})/TR_{D,bot}$ and (b) $MV_{b,bot}=MV_{f,bot}-MV_{bot}$;

where $TR_{B,bot}$ corresponds to a temporal spacing between the bottom field of the current macroblock and the field of the past macroblock which is referenced by $MV_{bot}$, $TR_{D,bot}$ corresponds to a temporal spacing between the bottom field of the future macroblock and the field of the past macroblock which is referenced by $MV_{bot}$, and $MV_{f,bot}$ is the forward motion vector for predicting the bottom field of the current macroblock.

27. The decoder of claim 26, further comprising:

means for selecting said equation (a) when a delta motion vector $MV_D=0$; and means for selecting said equation (b) when $MV_D\neq 0$.

*28. An encoded video signal, said signal comprising:*

*prediction information for providing a current, direct mode, field coded macroblock having top and bottom fields in a sequence of digital video macroblocks, said current macroblock being bi-directionally predicted using a past field coded reference macroblock having top and bottom fields, and a future field coded reference macroblock having top and bottom fields, said prediction information comprising:*

*a forward motion vector $MV_{top}$ of the top field of the future macroblock which references one of the top and bottom fields of the past macroblock, and*

*a forward motion vector $MV_{bot}$ of the bottom field of the future macroblock which references one of the top and bottom fields of said past macroblock;*

*wherein forward and backward motion vectors for predicting at least one of the top and bottom fields of the current macroblock are determinable from said prediction information by scaling the forward motion vector of the corresponding field of the future macroblock.*

* * * * *

UNITED STATES PATENT AND TRADEMARK OFFICE

CERTIFICATE OF CORRECTION

PATENT NO. : RE. 38,563 E
DATED : August 10, 2004
INVENTOR(S) : Eifrig et al.

It is certified that error appears in the above-identified patent and that said Letters Patent is hereby corrected as shown below:

Title page,
Item [73], Assignee, please add the following:
-- Assignee: General Instrument Corporation
Horsham, PA --

Signed and Sealed this

Eighteenth Day of January, 2005

JON W. DUDAS
*Director of the United States Patent and Trademark Office*